United States Patent [19]
Ito et al.

[11] Patent Number: 5,438,557
[45] Date of Patent: Aug. 1, 1995

[54] OPTICAL DISK STORAGE WHICH PROVIDES PULL-IN OF FOCUS SERVO AND PULL-IN OF TRACKING SERVO

[75] Inventors: Osamu Ito; Kyosuke Yoshimoto; Yoshihiro Kiyose; Kazuhiko Nakane, all of Amagasaki; Akira Mashimo, Tokorozawa; Hiroyuki Onda, Hoya; Koji Yamana, Setagaya; Takuya Nagata, Hoya, all of Japan

[73] Assignees: Mitsubishi Electric Corporation; TEAC Corporation, both of Japan

[21] Appl. No.: 217,772

[22] Filed: Mar. 24, 1994

Related U.S. Application Data

[63] Continuation of Ser. No. 767,080, Sep. 27, 1991, abandoned.

[30] Foreign Application Priority Data

Oct. 1, 1990 [JP] Japan .................................. 2-263554

[51] Int. Cl.⁶ .............................................. G11B 7/00
[52] U.S. Cl. .............................. 369/44.32; 369/44.28; 369/44.25; 250/201.5
[58] Field of Search ............... 369/44.28, 44.32, 44.27, 369/32, 54, 44.29, 33, 41, 44.14, 44.34, 44.25; 250/201.1–201.5

[56] References Cited

U.S. PATENT DOCUMENTS

| | | | |
|---|---|---|---|
| 4,630,252 | 12/1986 | Miura et al. | 369/33 X |
| 4,901,298 | 2/1990 | Masaki | 369/44.28 X |
| 4,918,676 | 4/1990 | Miyasaka | 369/44.28 X |
| 4,972,399 | 11/1990 | Miyasaka | 369/44.27 |
| 5,018,121 | 5/1991 | Yamamuro | 369/44.11 |
| 5,023,854 | 6/1991 | Satoh et al. | 369/44.29 |
| 5,063,549 | 11/1991 | Yamamuro | 369/44.28 |
| 5,146,442 | 9/1992 | Shikichi | 369/44.29 |

Primary Examiner—Aristotelis Psitos
Assistant Examiner—Thang V. Tran
Attorney, Agent, or Firm—Andrus, Sceales, Starke & Sawall

[57] ABSTRACT

A miniaturized optical disk apparatus which performs a pull-in of a focus servo and a pull-in of a tracking servo without a position detector for detecting an optical head. If the optical head is located at a non-reflection film area and thus the focus servo cannot be performed, then the optical head is moved and the focus servo is performed again. This process is repeated until the focus servo can be achieved. In addition, if the optical head is located at a non-track area, then the optical disk is moved to a track area and then the tracking servo is performed. This process also repeated until the optical head is located over the track area. The tracking servo can be stably performed since it is performed only when the optical head is located over the track area. The present invention is applicable to the optical disk apparatus which uses a 3.5 in optical disk.

18 Claims, 5 Drawing Sheets

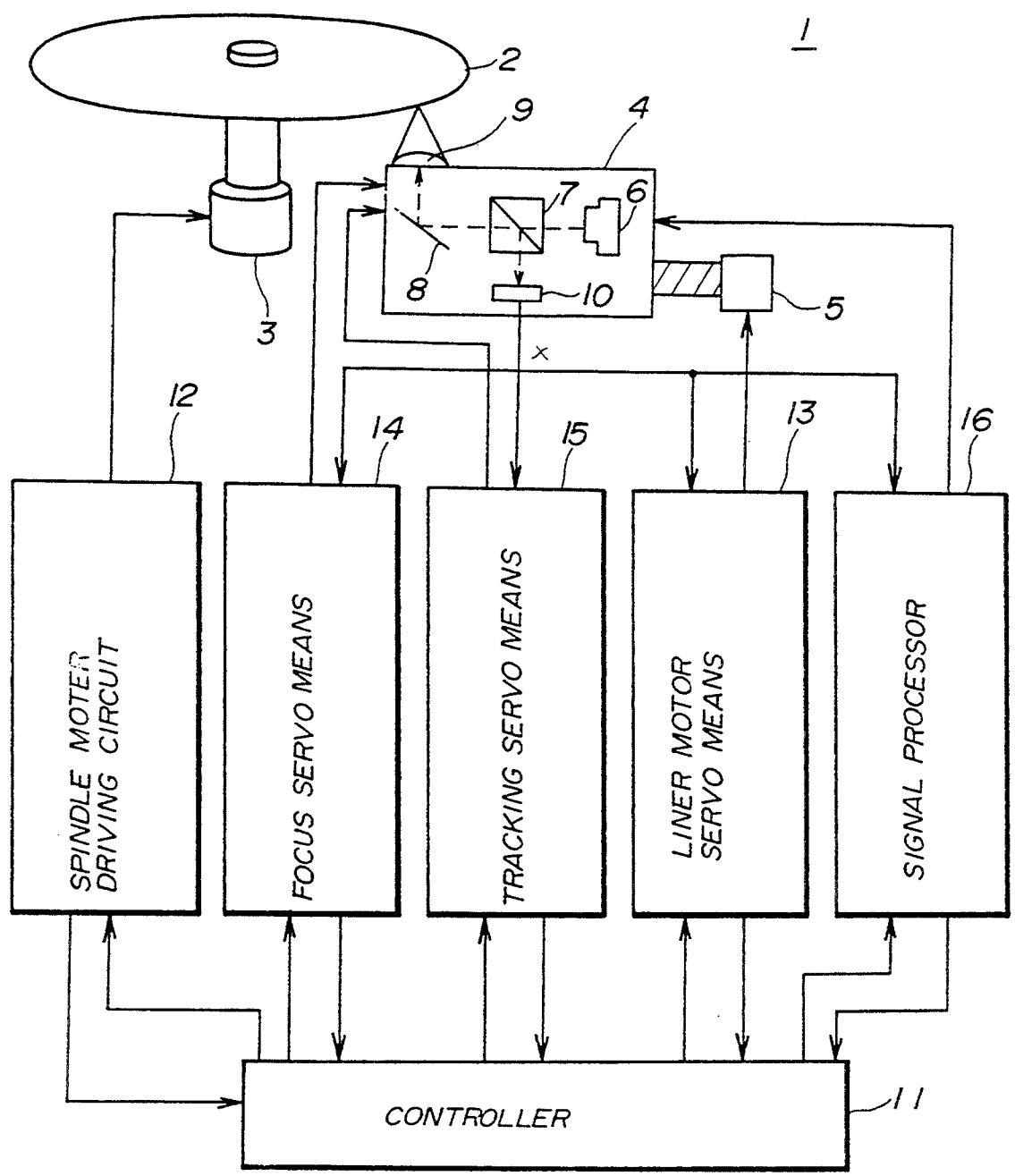

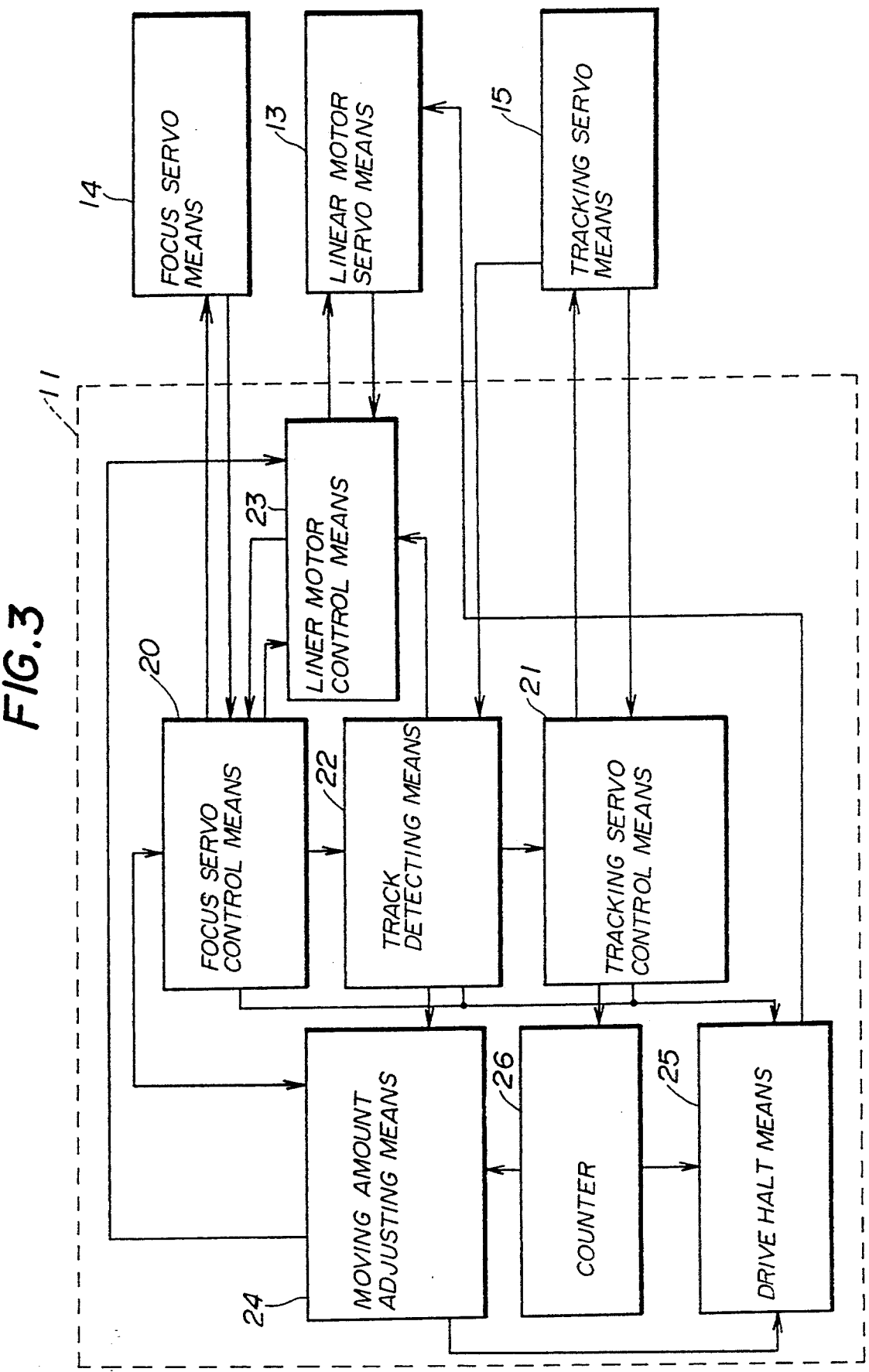

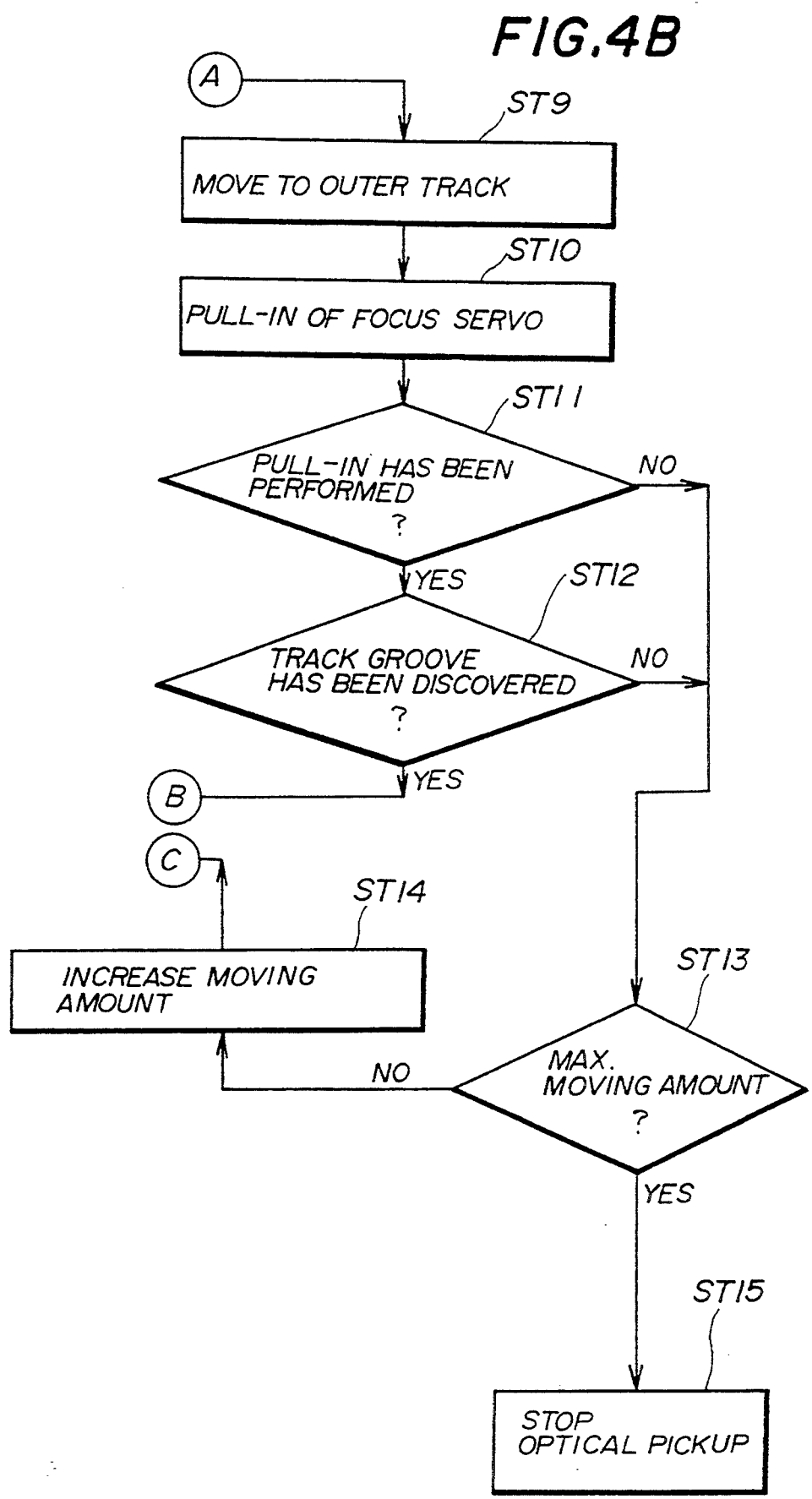

OPTICAL DISK STORAGE WHICH PROVIDES PULL-IN OF FOCUS SERVO AND PULL-IN OF TRACKING SERVO

The present application is a continuation application of U.S. patent application Ser. No. 07/767,080, filed Sep. 27, 1991, and now abandoned.

BACKGROUND OF THE INVENTION

The present invention relates generally to optical disk apparatuses, and more particularly to an optical disk apparatus which uses a 3.5 in optical disk and performs a so-called pull-in of a focus servo and a so-called pull-in of a tracking servo.

When a optical pickup of an optical disk apparatus seeks a target track, a focus servo and a tracking servo are first turned off and the optical pickup 52 is moved near the target track, along two shafts 51a and 51b, by a linear motor, as shown in FIG. 1. A conventional 5 in optical disk 50 comprises about 1000 read-in-tracks 53a at an inner part and about 1000 read-out-tracks 53b at an outer part. In addition, detectors 54 and 55, which respectively comprise dampers 54b and 55b and touch sensors 54a and 55a, are respectively provided near the read-in-tracks 53a and read-out-tracks 53b to prevent the optical pickup 52 from moving more inwardly than the read-in-tracks 53a or more outwardly than the read-out-tracks 53b. The respective touch sensors 54a and 55a detects a position of the optical pickup 52. The respective damper 54b and 55b prevent the optical pickup 52 from moving more inwardly than the read-in-tracks 53a or more outwardly than the read-out-tracks 53b.

Then the focus servo is turned on to perform a so-called pull-in of the focus servo and subsequently the tracking servo is turned on to perform a so-called pull-in of the tracking servo. Finally the optical pickup 52 starts to perform a seeking operation and is moved near the target track. Then the optical pickup 52 sequentially searches the target track by means of a track jump. Hereupon, the term "pull-in of the focus servo", as used herein, means a process for making an optical beam of the optical pickup focus on a recording surface of the optical disk. In addition, the term "pull-in of the tracking servo" as used herein, means an process for making an optical beam follow an arbitrary track. The pull-in of the focus servo can be achieved when the optical pickup is located at a reflection film area on the recording surface of the optical disk. On the other hand, the pull-in of the tracking servo can be achieved when the optical pickup is located at a track area on the recording surface of the optical disk. The track area, including the read-in-tracks to the read-out-tracks, is included in the reflection film area. Therefore, an area where both pull-in of the focus servo and pull-in of the tracking servo can be achieved is from and including the read-in-tracks to and including the read-out-tracks.

If the pull-in of the focus servo and the pull-in of the tracking servo cannot be properly achieved, the optical pickup cannot read an address number recorded in each track and thus will be at a loss to recognize where it is. As a result, it cannot seek the target track. Therefore, stable pull-in of the focus servo and the pull-in of the tracking servo achieves a stable and quick access operation. Generally, the pull-in of the focus servo and the pull-in of the tracking servo are performed when the optical disk storage is started or reset from a power-saving mode Incidentally, "a power-saving mode" is described in detail in U.S. patent application Ser. No. 731,500 previously filed by this applicant.

However, in an optical disk storage using a 3.5 inch optical disk, it is desirable to omit the detectors 54 and 55 shown in FIG. 1 from the standpoint of miniaturization, cost reduction and simplicity. However, such an optical disk storage in which the detectors 54 and 55 are omitted has not been developed in which the pull-in of the focus servo and the pull-in of the tracking servo can be achieved. In addition, since a 3.5 in optical disk has a few read-in-tracks, it is difficult for the optical pickup to detect them and stop there. Likewise, a 3.5 in optical disk has only about 300 read-out-tracks. Therefore, the following problems occur at the inner part and the outer part of the optical disk:

1. If the optical pickup is located at the non-reflection film area, the pull-in of the focus servo cannot be achieved.
2. Even if the pull-in of the focus servo can be achieved, if the optical pickup is located at the non-track area, the pull-in of the tracking servo cannot achieved.

SUMMARY OF THE INVENTION

Accordingly, it is a general object of the present invention to provide a novel and useful optical disk apparatus in which the above problems are eliminated.

The more specific object of the present invention is to provide an optical disk apparatus having a simple construction which performs a pull-in of a focus servo and pull-in of a tracking servo.

According to one feature of the present invention, an optical disk apparatus comprises an optical head which records information on an optical disk and/or reproduces information therefrom by radiating an optical beam on a predetermined track of a recording surface on the optical disk, head moving means for moving the optical head, focus servo means for performing a focus servo to make the optical beam of the optical head focus on the recording surface, and control means, coupled to the head moving means and focus servo means, for controlling the head moving means to move the optical head from a first position on the optical disk to a second position thereon apart from the first position by a predetermined distance, if the focus servo performed by the focus servo means fails at the first position, and for controlling the focus servo means to perform the focus servo again at the second position.

According to another feature of the present invention, an optical disk apparatus comprises an optical head which records information on an optical disk and/or reproduces information therefrom by radiating an optical beam on a predetermined track of a recording surface on the optical disk, head moving means for moving the optical head, tracking error signal generating means for generating a tracking error signal representing an offset of a track on the optical disk, tracking servo means, coupled to the tracking error signal generating means, for performing a tracking servo at a position having a least offset of a track so as to make the optical beam of the optical head follow the track on the optical disk, track detecting means, coupled to the tracking error signal generating means, for judging whether or not there is a track at an arbitrary position on the optical disk by using the tracking error signal generated by the tracking error signal generating means, and control means, coupled to the head moving means, tracking error signal generating means, tracking servo means and track detecting means, for controlling the head moving means to move the optical head from a first position on the optical disk to a second position thereon apart from the first position by a predetermined distance, if the track detecting means has judged that there is no track at the first position, for controlling the track detecting means to judge whether or not there is a track at the second position, and for controlling the tracking servo means to perform the tracking servo if the track detecting means judges there is a track.

According to still another feature of the present invention, an optical disk apparatus comprises an optical head which records information on an optical disk and/or reproduces information therefrom by radiating an optical beam on a predetermined track of a recording surface on the optical disk, head moving means for moving the optical head, focus servo means for performing a focus servo to make the optical beam of the optical head focus on the recording surface, tracking error signal generating means for generating a tracking error signal representing an offset of a track on the optical disk, tracking servo means, coupled to the tracking error signal generating means, for performing a tracking servo at a position having a least offset of a track so as to make the optical beam of the optical head follow the track on the optical disk, track detecting means, coupled to the tracking error signal generating means, for judging whether or not there is a track at an arbitrary position on the optical disk by using the tracking error signal generated by the tracking error signal generating means, and control means, coupled to the head moving means, focus servo means, tracking error signal generating means, tracking servo means and track detecting means, for controlling the head moving means to move the optical head from a first position on the optical disk to a second position thereon apart from the first position by a predetermined distance, if the focus servo performed by the focus servo means fails at the first position or if the track detecting means judges that there is no track at the first position, for controlling the focus servo means to perform the focus servo again at the second position, for controlling the track detecting means to judge whether or not there is a track at the second position, and for controlling the tracking servo means to perform the tracking servo if the track detecting means judges there is a track.

According to the present invention, since the conventional detectors are omitted, the miniaturized optical disk storage can be provided. If the optical head is located at a non-reflection film area and thus the focus servo cannot be performed, then the optical head is moved and the focus servo is performed again. This process is repeated until the focus servo can be achieved. In addition, if the optical head is located at a non-track area, then the optical disk is moved to a track area and then the tracking servo is performed. This process also repeated until the optical head is located at the track area. Incidentally, thanks to the track detecting means, the tracking servo can be stably performed since it is performed only when the optical head is located at the track area.

Other objects and further features of the present invention will become apparent from the following detailed description when read in conjunction with the accompanying drawings.

BRIEF DESCRIPTION OF THE DRAWINGS

FIG. 2 shows a block diagram of an optical disk apparatus according to the present invention;

FIG. 3 shows a block diagram of a controller shown in FIG. 2; and

DETAILED DESCRIPTION OF THE PREFERRED EMBODIMENTS

Figure 1:
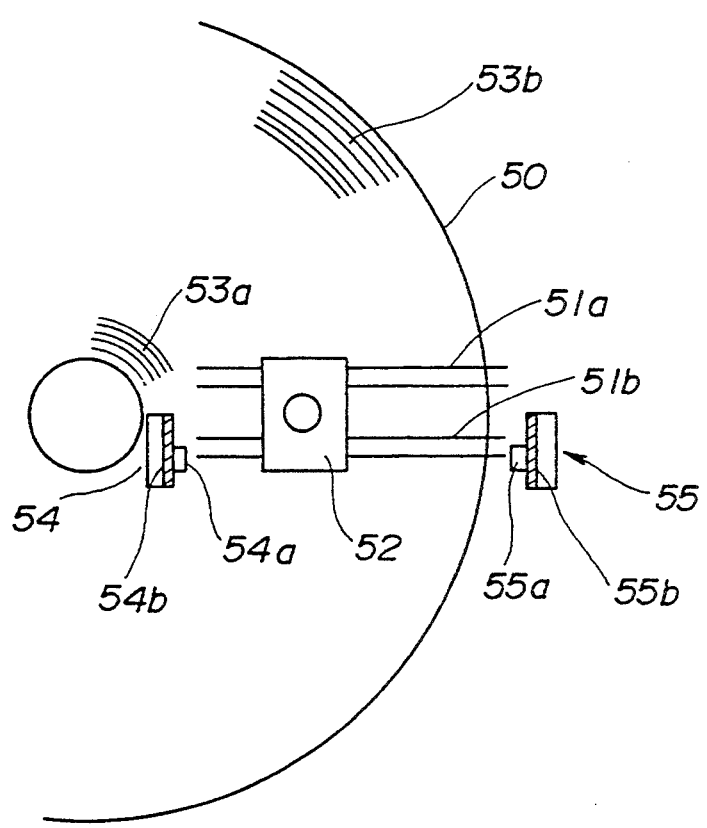
FIG. 1 is a view for explaining a conventional seek operation.

An optical disk apparatus 1 according to the present invention comprise, as shown in FIG. 2, a spindle motor 3, an optical pickup 4, a linear motor 5, a controller 11, a spindle motor driving circuit 12, linear motor servo means 13, focus servo means 14, tracking servo means 15 and a signal processor 16. The spindle motor 3 is connected to the spindle motor driving circuit 12. The optical pickup 4 is connected to the linear motor 5, linear motor servo means 13, focus servo means 14, tracking servo means 15 and signal processor 16. The controller 11 is connected to the spindle motor driving circuit 12, linear motor servo means 13, focus servo means 14, tracking servo means 15 and signal processor 16.

The spindle motor 3, driven by the spindle motor driving circuit 12, rotates an optical disk 2.

The optical pickup 4 is moved in the radial direction of the optical disk 2 by the linear motor 5. The optical pickup 4 comprises a laser beam source 6, a beam splitter 7, a reflection mirror 8, an objective lens 9 and a photodetector 10. A laser beam emitted from the laser beam source 6 passes through the beam splitter 7, is reflected by the reflection mirror 8, and focused on the optical disk 2 by the objective lens 9. In addition, the laser beam reflected from the optical disk 2 is radiated onto the photodetector 10 via the beam splitter 7. The photodetector 10 comprises, for example, four detecting parts made by dividing a square into four equal square parts. A focus error signal and a tracking error signal are respectively generated by adding or subtracting values measured by the respective detecting parts. Incidentally, in this embodiment, a calculation circuit which generates the focus error signal is provided for focus servo means 14 and a calculation circuit which generates the tracking error signal is provided for the tracking servo means 15.

The focus servo means 14 performs a focus servo based on the focus error signal at a position where the optical disk 2 vibrates least. The tracking servo means 15 performs a tracking servo based on the tracking error signal at a position having a least track offset. The signal processor 16 records information on the optical disk 2 and/or reproduces information therefrom.

The controller 11 controls the spindle motor driving circuit 12, linear motor servo means 13, focus servo means 14, tracking servo means 15 and signal processor 16. The controller 11 comprises, as shown in FIG. 3, focus servo control means 20, tracking servo control means 21, track detecting means 22, linear motor control means 23, moving amount adjusting means 24, drive halt means 25 and a counter 26. The focus servo control means 20 is connected to the focus servo means 14, track detecting means 22, linear motor control means 23, moving amount adjusting means 24 and drive halt means 25. The tracking servo control means 21 is connected to tracking servo means 15, track detecting means 22, drive halt means 25 and counter 26. The track detecting means 22 is connected to the tracking servo means 15, linear motor control means 23, moving amount adjusting means 24 and drive halt means 25. The linear motor control means 23 is connected to the linear motor servo means 13 and moving amount adjusting means 24. The moving amount adjusting means 24 is connected to the drive halt means 25 and counter 26. The drive halt means 25 is connected to the counter 26.

The focus servo control means 20 controls the focus servo means 14 and instructs it to perform the pull-in of the focus servo. The focus servo control means 20 informs track detecting means 22, linear motor control means 23, moving amount adjusting means 24 and drive halt means 25 whether or not the pull-in of the focus servo can be achieved.

The tracking error signal is supplied from the calculation circuit of the tracking servo means 15 to the track detecting means 22 after the pull-in of the focus servo has been achieved. The track detecting means 22 judges by using the tracking error signal whether or not there is a track at a position on the optical disk 2 where the optical pickup 4 is located, and informs the tracking servo control means 21, linear motor control means 23, moving amount adjusting means 24 and drive halt means 25 of the judging result.

The tracking servo control means 21 controls the tracking servo means 15 and instructs it to perform the pull-in of the tracking servo when the track detecting means 22 judges that there is a track. The tracking servo control means 21 informs the counter 26 of the number of attempted pull-in's of tracking servo, and, in addition, informs the drive halt means 25 of a failure of the pull-in.

The linear motor control means 23 controls the linear motor servo means 13 to move the optical pickup 4 by a moving amount defined by the moving amount adjusting means 24. The linear motor control means 23 moves the optical pickup 4 by a predetermined amount in accordance with the focus servo control means 20 and the track detecting means 22.

The moving amount adjusting means 24, controlled by the focus servo control means 20 and track detecting means 22, changes the moving amount of the optical pickup 4. In addition, its moving amount is reset by the counter 26. The moving amount adjusting means 24 prestores an allowable moving amount.

The drive halt means 25 controls the linear motor servo means 13 to stop the optical pick up 4 under a predetermined condition. The predetermined condition will be apparent from the following description.

The counter 26 prestores an allowable number of attempted pull-in's, and compares a number of attempted pull-in's of the tracking servo which is supplied from the tracking servo control means 21 with the allowable number of attempted pull-in's. The comparison result is supplied to the linear motor control means 23 and the drive halt means 25.

Figure 4A:
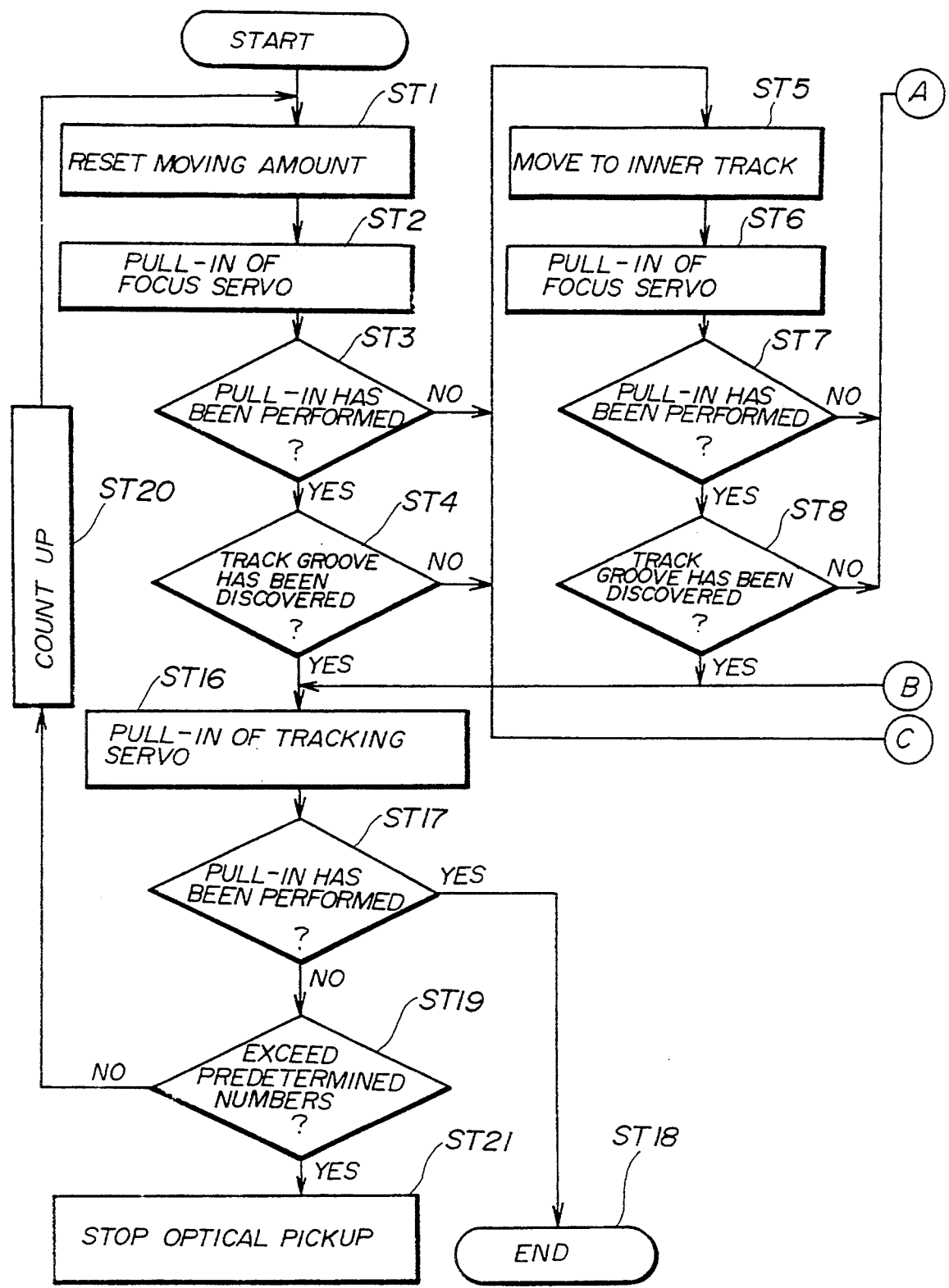
FIG. 4 shows a flowchart executed by the controller shown in FIG. 3.

Next, a description will now be given of the operation of the optical disk storage 1 with reference FIG. 4. The focus servo and the tracking servo are turned off. First, the moving amount adjusting means 24 resets the moving amount (in step ST1). Then, the focus servo control means 20 instructs the focus servo means 14 to perform the pull-in of the focus servo (in step ST2). The result as to whether or not the pull-in of the focus servo can be achieved is supplied from the focus servo means 14 to the focus servo control means 20 (in step ST3). If the pull-in of the focus servo has succeeded, the track detecting means 22 judges whether or not there is a track (in step ST4). If the pull-in of the focus servo is determined to have failed in the step ST3, or if there is determined to be no track in the step ST4, the linear motor control means 23 moves the optical pickup 4 by about 1000 inner tracks on the optical disk 2 (in step ST5), and instructs the focus servo control means 20 to perform the pull-in of the focus servo again (in step ST6). Then the focus servo control means 20 judges whether or not the pull-in of the focus servo can be achieved (in step ST7). If the pull-in of the focus servo has succeeded, the track detecting means 22 judges whether or not there is a track (in step ST8). If the pull-in of the focus servo is judged to be failed in the step ST7, of if there is judged to be no track in the step ST8, the linear motor control means 23 moves the optical pickup 4 from the original position by about 1000 outer tracks on the optical disk 2 (in step ST9), and instructs the focus servo control means 20 to perform the pull-in of the focus servo again (in step ST10). Then the focus servo control means 20 judges whether or not the pull-in of the focus servo can be achieved (ST11). If the pull-in of the focus servo has succeeded, the track detecting means 22 judges whether or not there is a track (in step ST12). Incidentally, after the respective steps ST11 and ST12, the optical pickup 4 may be moved towards the inner track or outer track for a predetermined number of times.

If the pull-in of the focus servo is judged to be failed in the step ST11 or if there is judged to be no track in the step ST12, the moving amount adjusting means 24 compares the present moving amount with the allowable moving amount (in step ST13), and, if the present moving amount is judged to reach the allowable moving amount, the drive halt means 25 stops the optical pickup 4 (in the step ST15). However, if the present moving amount is judged to smaller than the allowable moving amount, the moving amount adjusting means 24 increases the moving amount (in step ST14) and the procedure is fed back to the step ST5.

On the other hand, if the track detecting means 22 detects the track in the steps ST4, 8 and 12, the tracking servo control means 21 instructs the tracking servo means 15 to perform the pull-in of the tracking servo (in step ST16), and judges whether or not the pull-in of the tracking servo can be achieved (in step ST17). If the pull-in of the tracking servo is achieved, then the optical pickup 4 seeks the target track by means of a track jump.

However, if the pull-in of the tracking servo fails, the counter 26 compares the present number of attempted pull-in's of the tracking servo with the allowable number of attempted pull-in's (ST19). If the present number of attempted pull-in's of the tracking servo is smaller than the allowable number of attempted pull-in's, the counter 26 increases the present number of attempted pull-in's by 1 and the procedure is fed back to the step ST1 (in step ST20). On the contrary, if the present number of attempted pull-in's of the tracking servo reaches the allowable number of attempted pull-in's, the drive halt means 25 stops the optical pickup 4 (in step ST21). Incidentally, whether steps ST13, 14, 15, 19, 20 and 21 are provided is a matter of choice.

Thus, according to the present invention, if the pull-in of the focus servo fails, or if the track is not detected, the optical pickup is moved to inner track or outer track and then the focus servo is performed again or the track is detected. And if the pull-in of the focus servo is achieved and the track is detected, the tracking servo is performed. Therefore, the pull-in of the focus servo and the pull-in of the tracking servo can be achieved by a simple construction without the conventional detectors 54 and 55 shown in FIG. 1. In addition, adjustment of the moving amount and limitation of the number of attempted pull-in's results in a safe servo.

Further, the present invention is not limited these preferred embodiments, as various variations and modifications may be made without departing from the scope of the present invention.

What is claimed is:

1. An optical disk apparatus comprising:
   an optical head which records information on an optical disk and/or reproduces information therefrom by radiating an optical beam of the optical head on a predetermined track of a recording surface on the optical disk;
   head moving means for moving said optical head;
   focus servo means for performing a focus servo to make the optical beam of the optical head focus on the recording surface, and for determining whether or not a pull-in of a focus servo has failed; and
   control means, coupled to said head moving means and focus servo means, for controlling said head moving means to move said optical head from a first position with respect to the optical disk to a second position with respect to the optical disk spaced from the first position by a predetermined distance in a radial direction of the optical disk, if it is determined by said focus servo means that a pull-in of a focus servo performed by said focus servo means has failed at the first position because the first position is located in a non-reflection area of the optical disk, and for controlling said focus servo means to perform the focus servo again at the second position.

2. An optical disk apparatus according to claim 1, wherein said control means is further defined as means for controlling said head moving means to move said optical head from the second position to a position spaced from the second position by the predetermined distance if the focus servo cannot be achieved at the second position, and to repeat the moving of said optical head, within the limits of a predetermined number of times, until the focus servo performed by said focus servo means can be achieved.

3. An optical disk apparatus according to claim 2, wherein said control means is further defined as means for controlling said head moving means to stop the optical head if the number of movements of said optical head reaches a predetermined number.

4. An optical disk apparatus according to claim 1, wherein said control means is further defined as means for controlling said head moving means to move said optical head from the second position if the focus servo cannot be achieved at the second position, to similarly repeat the moving of said optical head, within the limits of a predetermined number of times, until the focus servo performed by said focus servo means can be achieved, and to each time change a moving distance of said optical head within the limit of an allowable distance.

5. An optical disk apparatus according to claim 4, wherein said control means is further defined as means for controlling said head moving means to stop the optical head if the number of movements of said head reaches a predetermined number.

6. An optical disk apparatus according to claim 4, where said control means is further defined as means for controlling said head moving means to stop the optical head if the movement of said optical head reaches an allowance distance.

7. An optical disk apparatus comprising:
   an optical head which records information on an optical disk and/or reproduces information therefrom by radiating an optical beam of the optical head on a predetermined track of a recording surface on the optical disk;
   head moving means for moving said optical head;
   tracking error signal generating means for generating a tracking error signal representing an offset of the tracking on the optical disk;
   tracking servo means, coupled to said tracking error signal generating means, for performing a tracking servo at a position having a least offset of a track so as to make the optical beam of the optical head follow the track on the optical head;
   track detecting means, coupled to said tracking error signal generating means, for determining whether or not there is a track groove at an arbitrary position on the optical disk by using the tracking error generated by said tracking error signal generating means; and
   control means, coupled to said head moving means, tracking error signal generating means, tracking servo means and track detecting means, for controlling said head moving means to move said optical head from a first position with respect to the optical disk to a second position with respect to the optical disk spaced from the first position by a predetermined distance in a radial direction of the optical disk, if said track detecting means has determined that there is no track groove at the first position, for controlling said track detecting means to determine whether or not there is a track groove at the second position, and for controlling said tracking servo means to perform the tracking servo if said track detecting means determines there is a track groove.

8. An optical disk apparatus according to claim 7, wherein said control means is further defined as means for controlling said head moving means to move said optical head from the second position to a position spaced from the second position by the predetermined distance if said track groove detecting means determines that there is no track at the second position, and to repeat the moving of said optical head, within the limits of a predetermined number of times, until said track detecting means determines that there is a groove.

9. An optical disk apparatus according to claim 8, where said control means is further defined as means for controlling said head moving means to stop the optical head if the number of movements of said optical head reaches a predetermined number.

10. An optical disk apparatus according to claim 7, wherein said control means is further defined as means for controlling said head moving means to move said optical head from the second position to a position spaced from the second position by the predetermined distance if said track detecting means determines that there is no track groove at the second position, to repeat the moving of said optical head, within the limits of a predetermined number of times, until said track detecting means determines that there is a track groove, and to each time change a moving amount of said optical head within the limit of an allowable distance.

11. An optical disk apparatus according to claim 10, wherein said control means is further defined as means for controlling said head moving means to stop the optical head if the number of movements of said optical head reaches predetermined number.

12. An optical disk apparatus according to claim 10, wherein said control means is further defined as means for controlling said head moving means to stop the optical head if the movement of said optical head reaches an allowable distance.

13. An optical disk apparatus comprising:
an optical head which records information on an optical disk and/or reproduces information therefrom by radiating an optical beam of the optical head on a predetermined track of a recording surface on the optical disk;
head moving means for moving said optical head;
focus servo means for performing a focus servo to make the optical beam of the optical head focus on the recording surface, and for determining whether or not a pull-in of a focus servo has failed; and
tracking error signal generating means for generating a tracking error signal representing an offset of a track on the optical disk;
tracking servo means, coupled to said tracking error signal generating means, for performing a tracking servo at a position having a least offset of a track so as to make the optical beam of the optical head follow the track on the optical disk;
track detecting means, coupled to said tracking error signal generating means, for determining whether or not there is a track at an arbitrary position on the optical disk by using the tracking error signal generated by said tracking error signal generating means; and
control means, coupled to said head moving means, focus servo means, tracking error signal generating means, tracking servo means and track detecting means, for controlling said head moving means to move said optical head from a first position with respect to the optical disk to a second position with respect to the optical disk spaced from the first position by a predetermined distance in a radial direction of the optical disk, if it is determined by said focus servo means that a pull-in of the focus servo performed by said focus servo means has failed at the first position because the first position is located in a non-reflection area of the optical disk, or if said track detecting means determines that there is no track groove at the first position, for controlling said focus servo means to perform the focus servo again at the second position, for controlling said track detecting means to determine whether or not there is a track groove at the second position, and for controlling said tracking servo means to perform the tracking servo if said track detecting means determines there is a track groove.

14. An optical disk apparatus according to claim 13, wherein said control means is further defined as means for controlling said head moving means to move said optical head from the second position to a position spaced from the second position by the predetermined distance if the focus servo cannot be achieved at the second position or if said track detecting means determines that there is no track groove at the second position, and to repeat the moving of said optical head, within the limits of a predetermined number of times, until the focus servo performed by said focus servo means can be achieved and said track detecting means determines that there is a track groove.

15. An optical disk apparatus according to claim 14, where said control means is further defined as means for controlling said head moving means to stop the optical head if the number of movements of said optical head reaches a predetermined number.

16. An optical disk apparatus according to claim 13, wherein said control means is further defined as means for controlling said head moving means to move said optical head from the second position to a position spaced from the second position by the predetermined distance if the focus servo cannot be achieved at the second position or if said track detecting means determines that there is no track groove at the second position, to repeat the moving of said optical head, within the limits of a predetermined number of times, until the focus servo performed by said focus servo means can be achieved and said track detecting means determines that there is a track groove, and to each time change a moving amount of said optical head within the limit of an allowable distance.

17. An optical disk apparatus according to claim 16, where said control means is further defined as means for controlling said head moving means to stop the optical head if the number of movements of said optical head reaches a predetermined number.

18. An optical disk apparatus according to claim 16, wherein said control means is further defined as means for controlling said head moving means to stop the optical head if the movement of said optical head reaches an allowable distance.

* * * * *